US007178976B2

(12) United States Patent
Gerber

(10) Patent No.: US 7,178,976 B2
(45) Date of Patent: Feb. 20, 2007

(54) BLENDER FOR INGREDIENTS INTO SOFT-SERVE FREEZER PRODUCTS

(75) Inventor: Ernest C. Gerber, Danville, IN (US)

(73) Assignee: Flavor Burst Co., Danville, IN (US)

( * ) Notice: Subject to any disclaimer, the term of this patent is extended or adjusted under 35 U.S.C. 154(b) by 525 days.

(21) Appl. No.: 10/796,742

(22) Filed: Mar. 9, 2004

(65) Prior Publication Data
US 2005/0201196 A1    Sep. 15, 2005

(51) Int. Cl.
*B01F 15/02* (2006.01)
(52) U.S. Cl. .................. 366/177.1; 366/181.1; 366/181.3; 366/181.4; 366/196
(58) Field of Classification Search ............. 366/194, 366/195, 196, 181.4, 181.2, 181.3, 181.1, 366/177.1, 76.93, 76.92, 76.91, 76.9; 222/367, 222/145.1, 145.6, 145.5, 135, 129; 141/104, 141/106, 107, 105; 62/342
See application file for complete search history.

(56) References Cited

U.S. PATENT DOCUMENTS

| | | | |
|---|---|---|---|
| 2,032,970 A | 3/1936 | Bendfelt | |
| 2,190,226 A | 2/1940 | Alexander | |
| 2,239,165 A | 4/1941 | Adams | |
| 2,576,842 A | 11/1951 | Lehner | |
| 2,995,107 A | 8/1961 | Archer | |
| 3,001,770 A | 9/1961 | Mueller | |
| 3,014,437 A | 12/1961 | Dutchess | |
| 3,167,031 A | 1/1965 | Taylor | |
| 3,181,838 A * | 5/1965 | Johansen ................. 366/177.1 |
| 3,291,076 A | 12/1966 | Flanigan et al. | |
| 3,347,287 A | 10/1967 | Geber | |
| 3,615,147 A * | 10/1971 | Hayashi ................... 425/133.1 |
| 3,664,640 A * | 5/1972 | Morin ...................... 366/160.5 |
| 3,803,870 A * | 4/1974 | Conz ........................... 62/342 |
| 3,858,498 A * | 1/1975 | Swenson .................... 62/342 |
| 3,901,409 A * | 8/1975 | Bradley et al. .......... 366/182.3 |
| 3,918,862 A | 11/1975 | Bellew | |
| 3,948,491 A * | 4/1976 | Karlsson .................. 366/181.3 |
| 4,010,284 A | 3/1977 | Bellew | |
| 4,100,304 A | 7/1978 | Getman | |
| 4,188,768 A | 2/1980 | Getman | |
| 4,189,289 A | 2/1980 | Getman | |
| 4,364,666 A * | 12/1982 | Keyes ....................... 366/142 |
| 4,397,880 A | 8/1983 | Crothers | |
| 4,397,881 A | 8/1983 | Crothers | |
| 4,448,114 A | 5/1984 | Mayer | |
| 4,627,555 A * | 12/1986 | Locke ..................... 366/162.2 |
| 4,643,335 A | 2/1987 | Carnisio | |

(Continued)

Primary Examiner—Tony G. Soohoo
(74) Attorney, Agent, or Firm—Woodard Emhardt Moriarty McNett & Henry LLP

(57) ABSTRACT

An assembly is mounted to a soft serve confection freezer. It includes a set of modules in a circular array and separately replaceable in a magazine. Each module supports a container storing a dry food ingredient in particulate form, and has a motor driven product impeller for controlled discharge of particulates from the container to a blender assembly. The blender assembly has a housing and screw-type auger of cooperating configurations and which cooperate with a central passageway for frozen confection flowing from the freezer, to blend solids into the confection and discharge into a customer's container for immediate consumption. Control panel selection of ingredients by the operator according to the customer's order, is provided. Components are arranged to facilitate cleaning.

53 Claims, 14 Drawing Sheets

U.S. PATENT DOCUMENTS

| | | | | |
|---|---|---|---|---|
| 4,643,905 | A | 2/1987 | Getman | |
| 4,668,561 | A | 5/1987 | Ney | |
| 4,793,520 | A | 12/1988 | Gerber | |
| 4,861,255 | A | 8/1989 | Ney | |
| 4,881,663 | A | 11/1989 | Seymour | |
| 4,923,093 | A | 5/1990 | Gerber | |
| 5,240,324 | A * | 8/1993 | Phillips et al. | 366/132 |
| 5,256,426 | A | 10/1993 | Tomioka et al. | |
| 5,280,859 | A * | 1/1994 | Rust et al. | 241/101.6 |
| 5,378,483 | A | 1/1995 | Fazio et al. | |
| 5,603,458 | A * | 2/1997 | Sandolo | 241/34 |
| 5,685,435 | A * | 11/1997 | Picioccio et al. | 222/189.02 |
| 5,690,283 | A * | 11/1997 | Sandolo | 241/34 |
| 5,743,639 | A * | 4/1998 | Puerner et al. | 366/182.1 |
| 5,823,392 | A | 10/1998 | Madico | |
| 6,145,701 | A * | 11/2000 | Van Der Merwe et al. | 222/145.1 |
| 6,319,532 | B1 | 11/2001 | Pineault | |
| 6,402,363 | B1 * | 6/2002 | Maguire | 366/141 |
| 6,514,555 | B1 | 2/2003 | Fayard et al. | |
| 6,725,889 | B2 * | 4/2004 | Perez Vales | 141/104 |
| 6,863,429 | B2 * | 3/2005 | Torghele et al. | 366/76.92 |

* cited by examiner

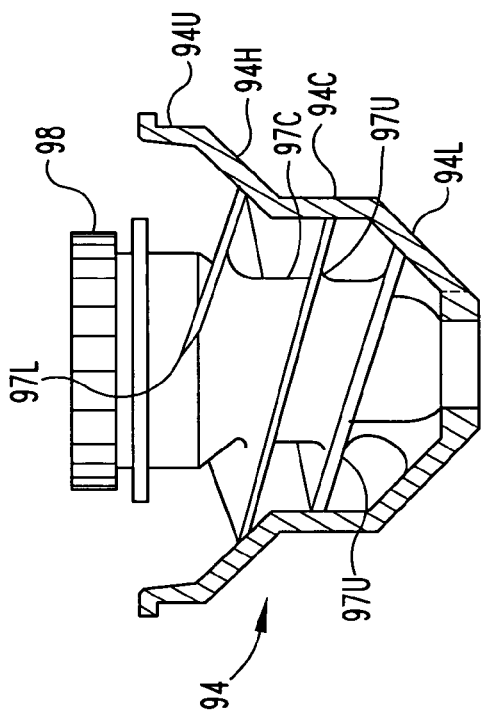
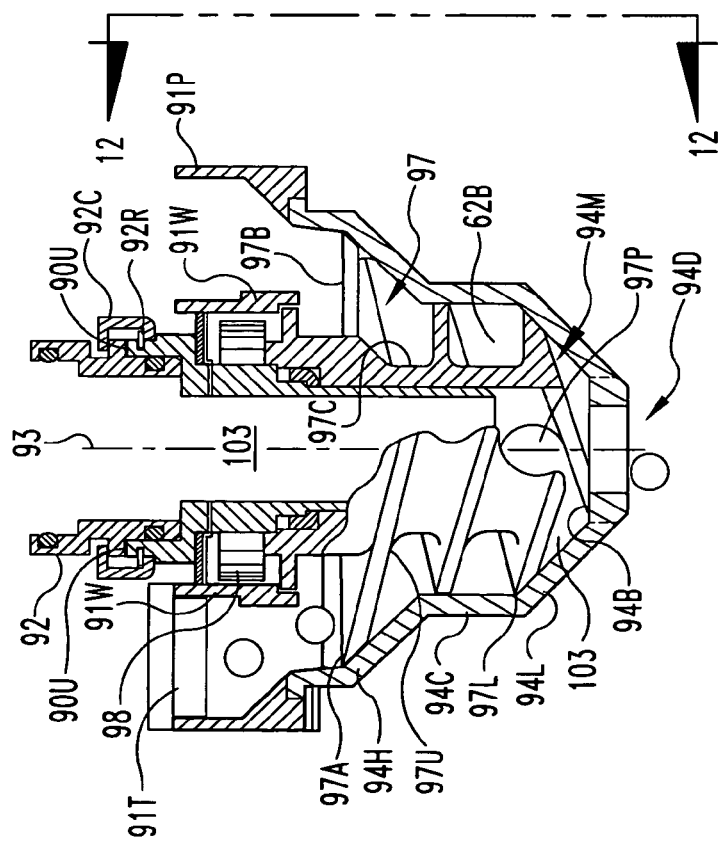
Fig. 12
Fig. 11

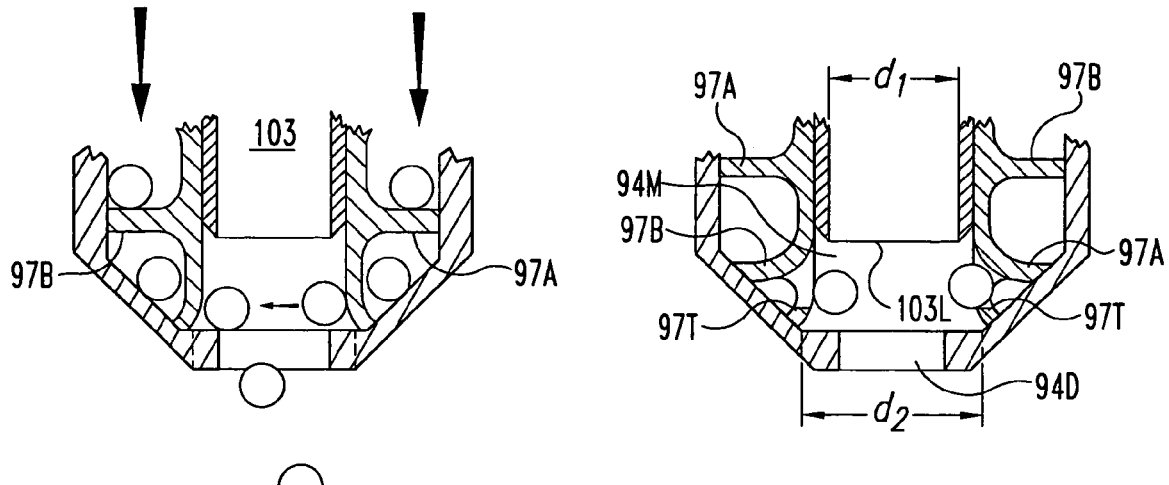
Fig. 13
Fig. 14
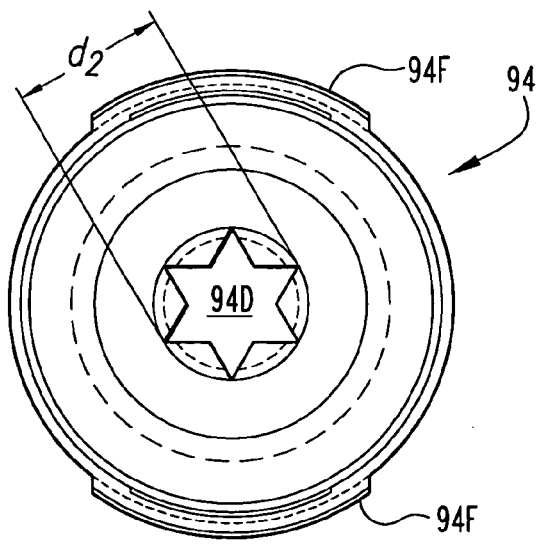
Fig. 15

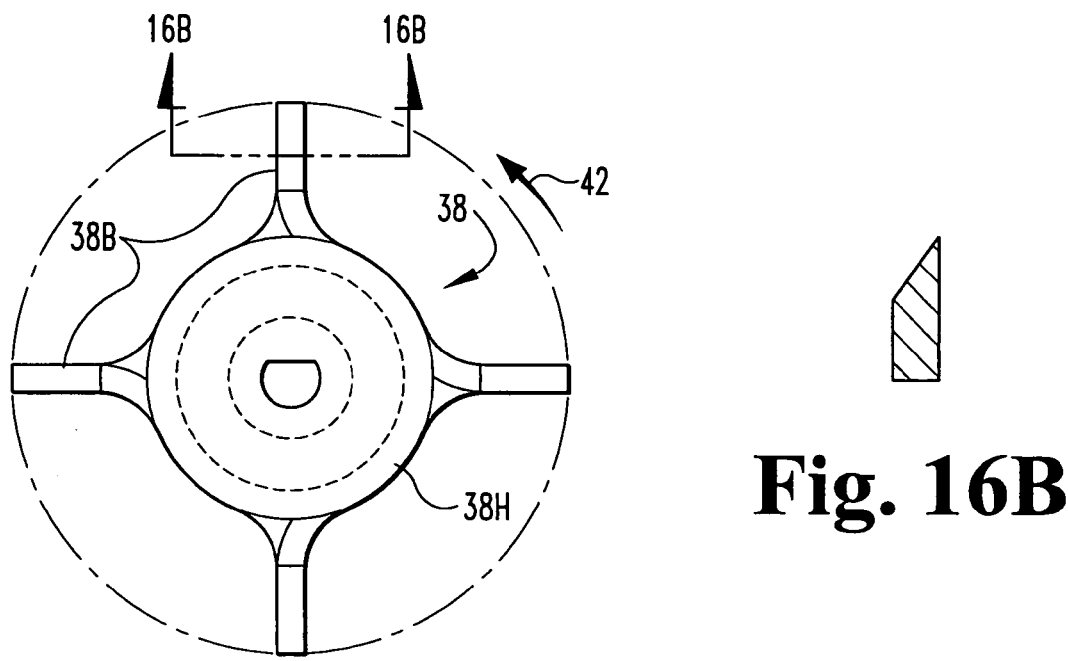
Fig. 16A
Fig. 16B
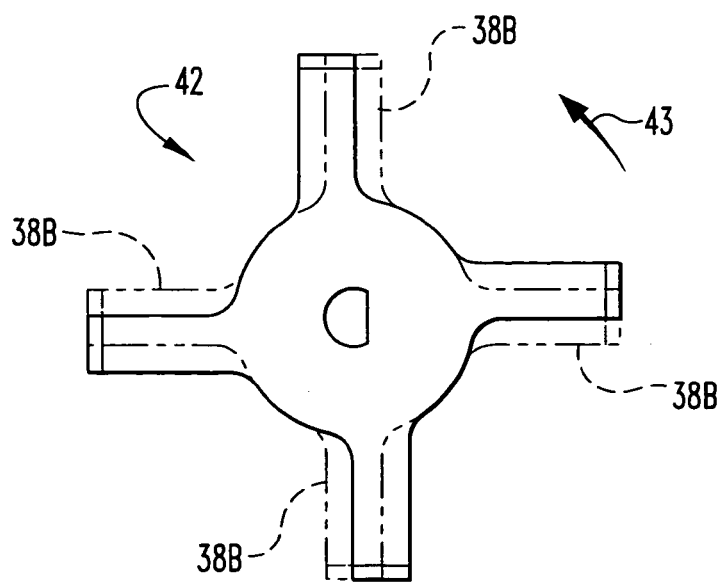
Fig. 17

BLENDER FOR INGREDIENTS INTO SOFT-SERVE FREEZER PRODUCTS

BACKGROUND OF THE INVENTION

This invention relates generally to apparatus for dispensing flavored, flow-able frozen foods to a customer for soft-serve ice cream, ice milk, ices, smoothies, slushes, shakes or the like.

My U.S. Pat. No. 4,793,520 issued Dec. 27, 1988 and certain patents cited therein, disclose various approaches to mixing several different flavoring liquids to a base mix of ice cream. U.S. Pat. No. 3,001,770 issued to Mueller on Sep. 26, 1961 shows a machine for mixing different flavoring liquids with ice cream and has a device for injecting nuts into the mixture. To the best of my knowledge, there is no apparatus available which can be connected to a conventional freezer machine for soft-serve ice cream or some other semi-frozen edible product, and which is useful to select and blend one or more different ingredients into the food product of the freezer machine for dispensing into a cone or cup to a customer immediately upon demand. The present invention is addressed to this need.

SUMMARY OF THE INVENTION

Described briefly, a typical embodiment of the invention comprises method and apparatus readily adaptable to use with conventional, commercially available freezer dispensers for semi-frozen foods, and enabling selection and blending various different food ingredients in solid form into a food product dispensed as a fluid (hereinafter referred to as frozen base product) from the freezer dispenser at a temperature below 0 degrees Celsius, and dispensing selected blends of solids in frozen base product in fluid form to a customer's container on demand.

BRIEF DESCRIPTION OF THE DRAWINGS

FIG. 11 is a fragmentary longitudinal sectional view taken at line 11—11 in FIG. 10, viewed in the direction of the arrows and showing the blending auger in a blender hopper which is shown in full section.

FIG. 12 is an elevational view of the auger in the hopper shown in section and viewed in the direction of arrows 12—12 in FIG. 11.

FIG. 13 is a fragmentary longitudinal sectional view of part of the blending auger and blender hopper taken at line 13—13 in FIG. 10 and showing the shape of the lower end portion of the auger core at a position about 60 degrees of rotational index about axis 93 from the FIG. 11 position.

FIG. 14 is a view similar to FIG. 13 but taken at line 14—14 in FIG. 10 and showing the shape of the auger core and flights at a slightly further rotational index position where portions of the core are cut-out to admit ingredient solids into a downward flowing frozen confection base product.

FIG. 15 is a top view of the blender hopper, showing one possible outlet shape, and showing mounting flanges.

FIG. 16A is a top plan view of a transfer impeller.

FIG. 16B is a section taken at line B—B in FIG. 16A and viewed in the direction of the arrows.

FIG. 17 is a top plan view of an agitator.

DESCRIPTION OF THE ILLUSTRATED EMBODIMENT

Figure 1:
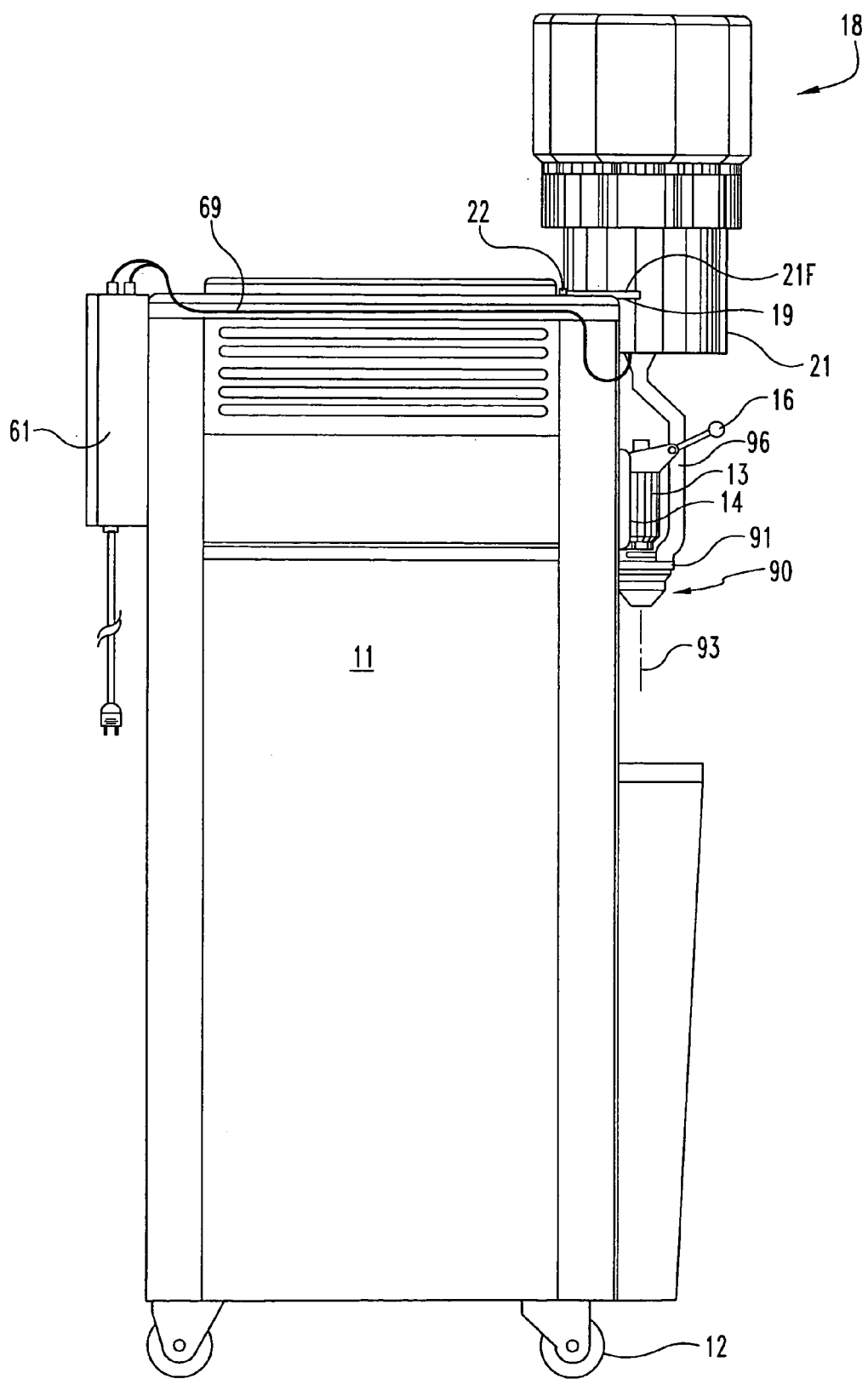
FIG. 1 is a side elevational view of a conventional soft-serve ice cream freezer machine with a blender dispenser mounted to it according to one embodiment of the present invention.

Referring now to the drawings in detail, a soft-serve ice cream freezer assembly 11 is supported on wheels 12 and has a discharge spigot 13 on a front plate 14 removable from the freezer, usually by loosening four knobs. The spigot has an operating handle 16. Upon pulling the handle down, a frozen, usually unflavored, base product is discharged from the freezer through the spigot in the direction of arrow 17. Examples of such soft serve freezers are Taylor Model 754, 338, 339, 741, H84, 8754, C706, C707, and C708. Other brands of freezers may be used also. Some older Taylor models and other brands are identified in my above-mentioned patent.

Apparatus incorporating an embodiment of the present invention includes an ingredient storage assembly, a blender assembly, means for transfer of selected ingredients from the storage assembly to the blender assembly, and related mounting, selection and control devices.

Figure 5:
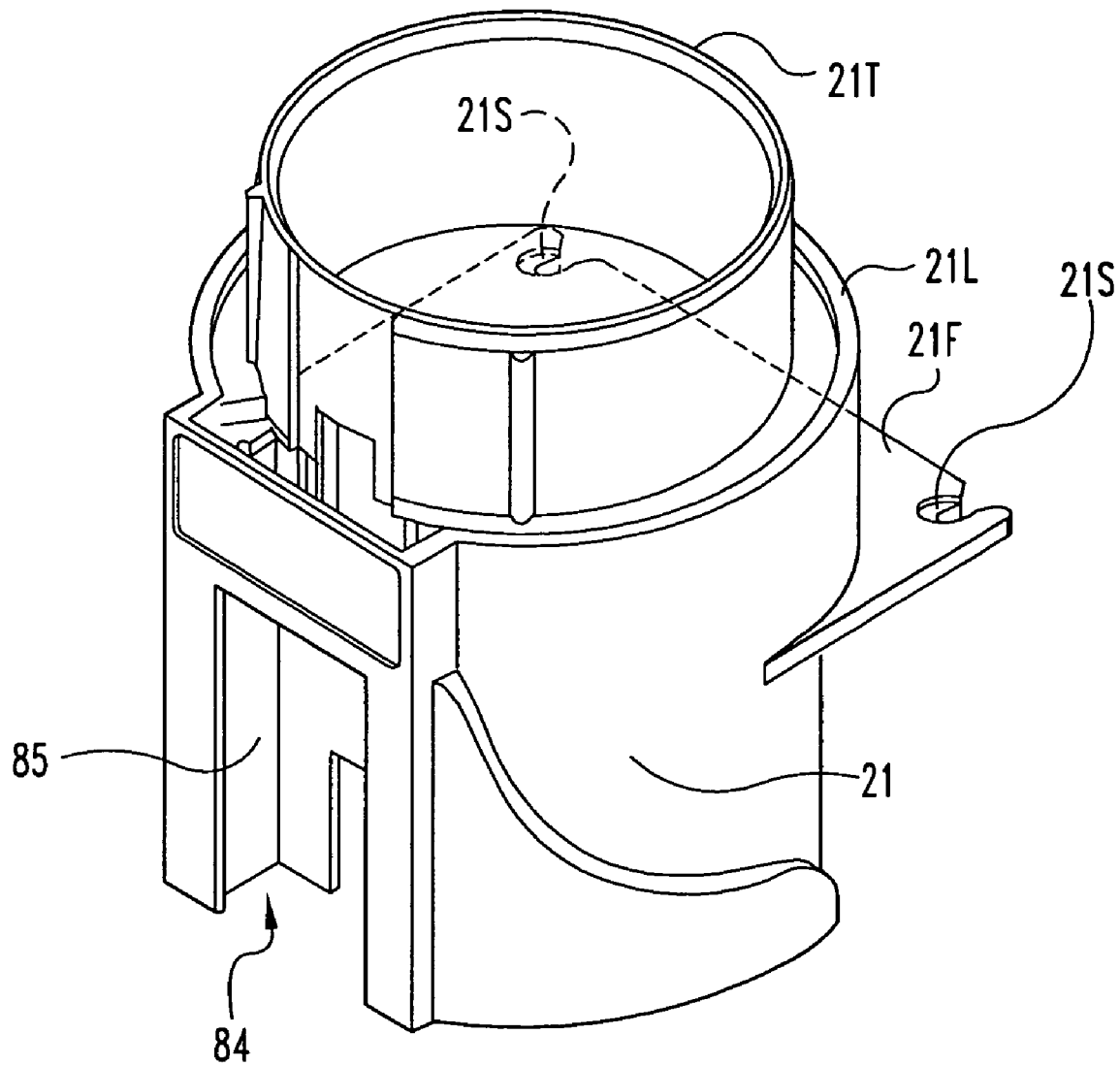
FIG. 5 is a perspective view of a mounting base for the ingredient storage assembly.

The ingredient storage and transfer assembly 18 is attached to the top of the freezer by use of a mounting plate 19 (FIG. 1). This plate uses a double-faced bonding tape that bonds the plate to the top of the freezer cabinet. Other or additional fasteners may be used, if desired. Mounting base 21 is a molded plastic part FIG. 5 having a flange 21F with slots 21S in its rear-edge receiving upstanding studs (not shown) on the mounting plate 19. It is attached to the mounting plate by use of two clamping knobs 22 screwed onto the studs and securing the mounting base to the mounting plate.

Figure 6:
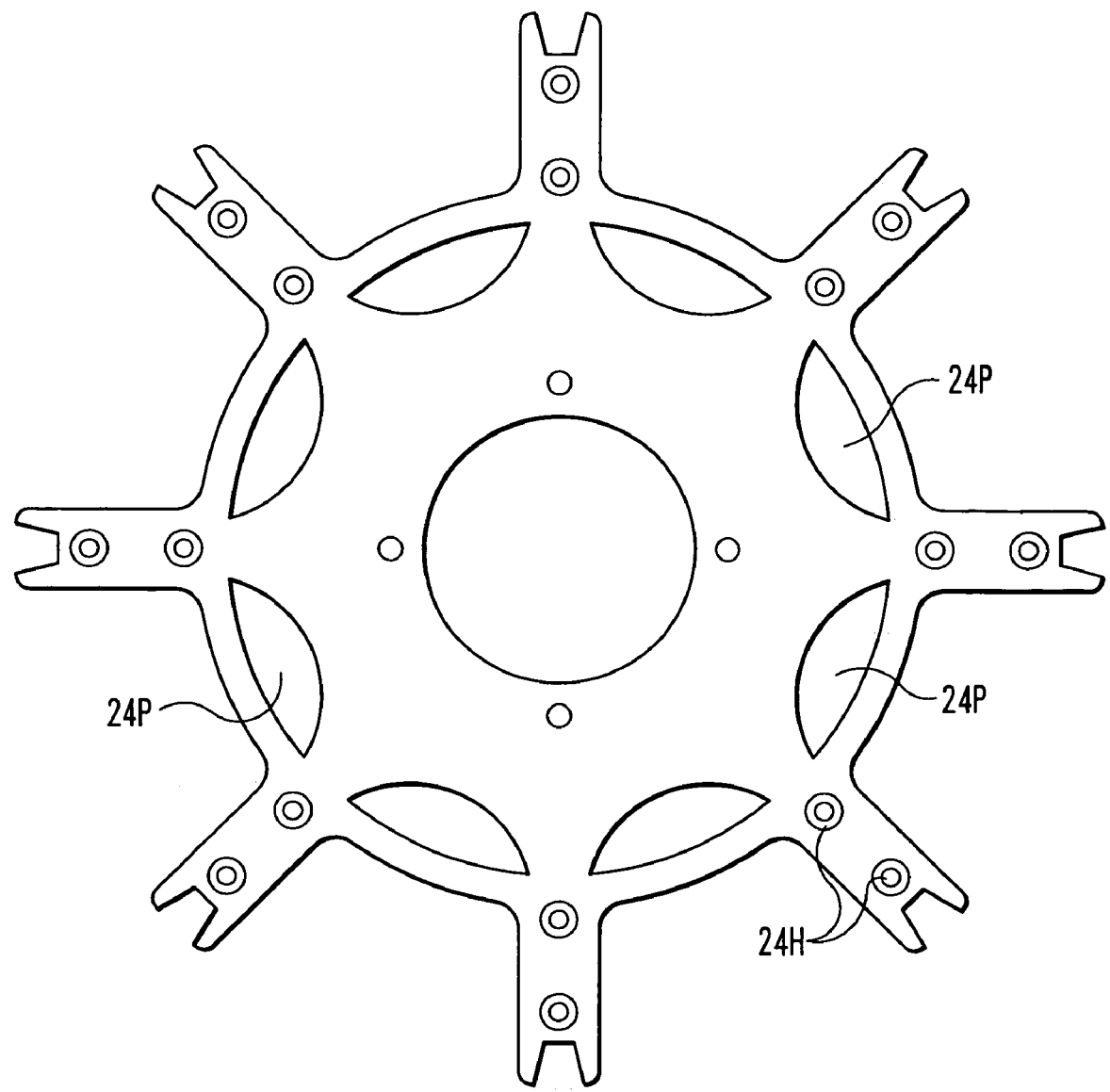
FIG. 6 is a face view of an upper support plate for the ingredient storage assembly.
Figure 7:
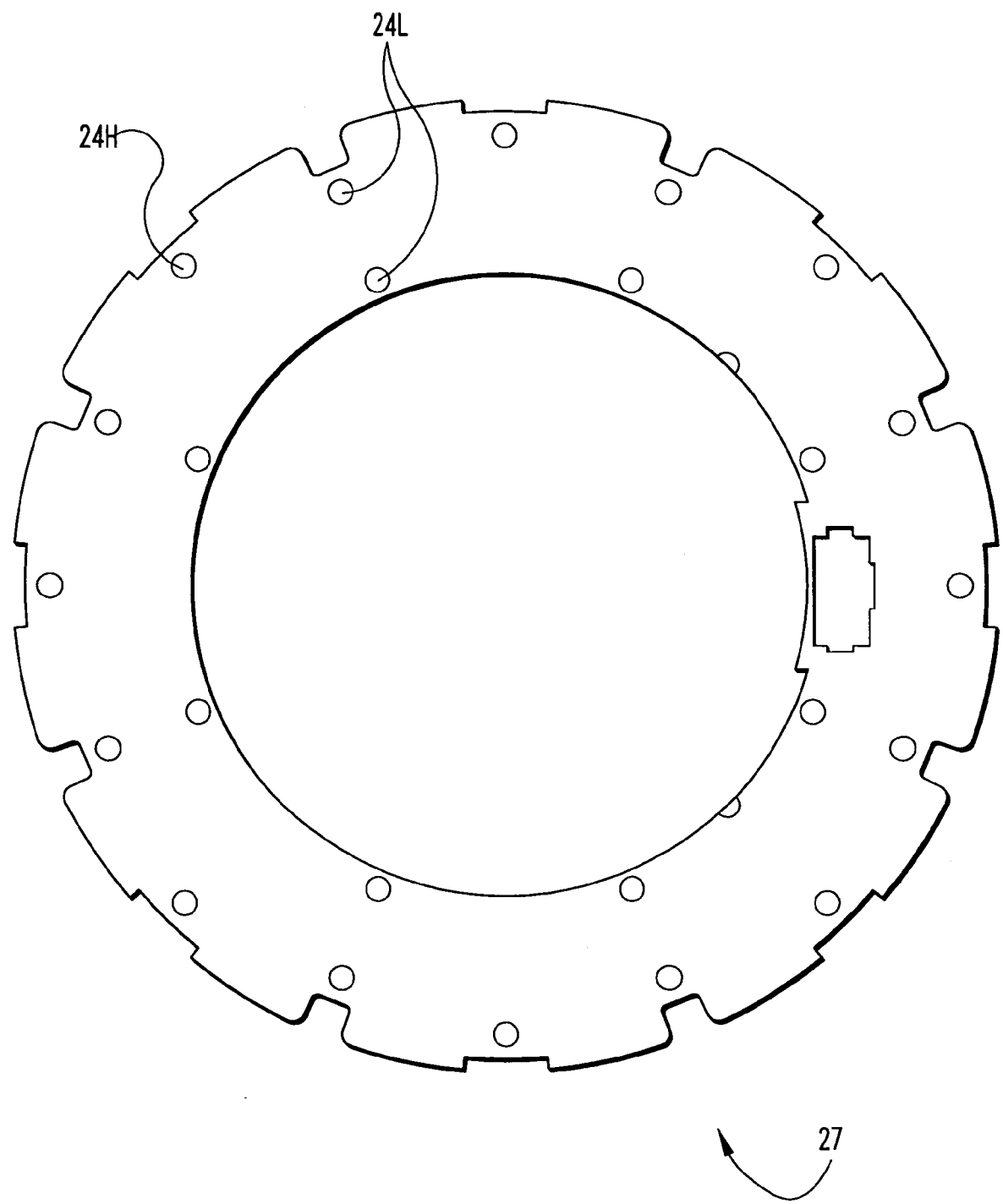
FIG. 7 is a face view of a lower support plate for the ingredient storage assembly.

The upper end of the mounting base 21 supports and centers the top flange of funnel 23. An upper support plate 24 (FIGS. 2A and 6) rests on the top flange of the funnel. This plate supports eight removable modules 25 in a circular array about an axis 26 through the center of the plate 24. A lower support plate 27 (FIGS. 2A and 7) rests on the ledge 21L of the mounting base. It is connected to upper support plate 24 by an array of eight circularly spaced vertical support plates 28, preferably made of molded plastic and having bosses 28B at upper and lower edges receiving screws through the holes 24H and 27H in the upper and lower support plates 24 and 27, respectively. This assembly of plates 24, 27 and 28 provides a receiver frame in the ingredient storage assembly 18 for the eight removable dispensing modules 25 mentioned above. These modules have motor housings 29 supporting container bases 31 receiving eight ingredient containers 32. Each of these containers contains a different type of solids capable of being blended into the base product flowing from the freezer to the spigot outlet when the handle 16 is pulled down. A "solid" for such purposes may be defined as a discrete tangible edible item appearing dry to touch at 72° F., elastic or inelastic, porous or non-porous, hollow or not hollow, and having a maximum overall dimension in any direction less than or equal to about 0.300 inches. Some types of solids include, but are not limited to, nuts of different types and flavors, raisins, M & M's, chocolate chips, different flavors of fruit bits, different flavors of candy bits and sprinkles, to name a few. Others may be used too. Also, if it is found that customers have a greater preference for one type than some of the other types, more than one of the containers can be filled with the preferred type.

Figure 2A:
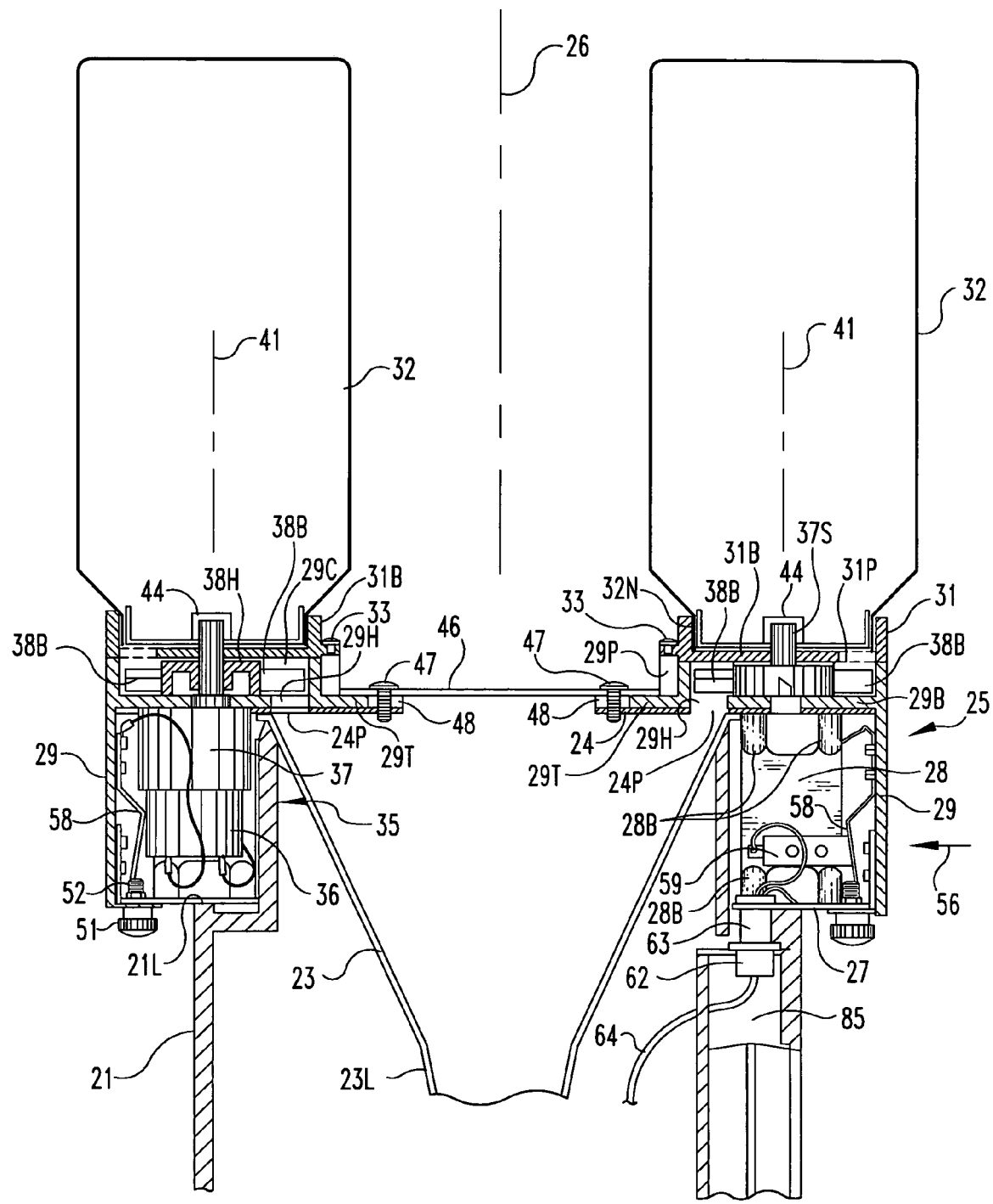
FIG. 2A is an enlarged front view in section of an ingredient storage and transfer assembly.
Figure 8:
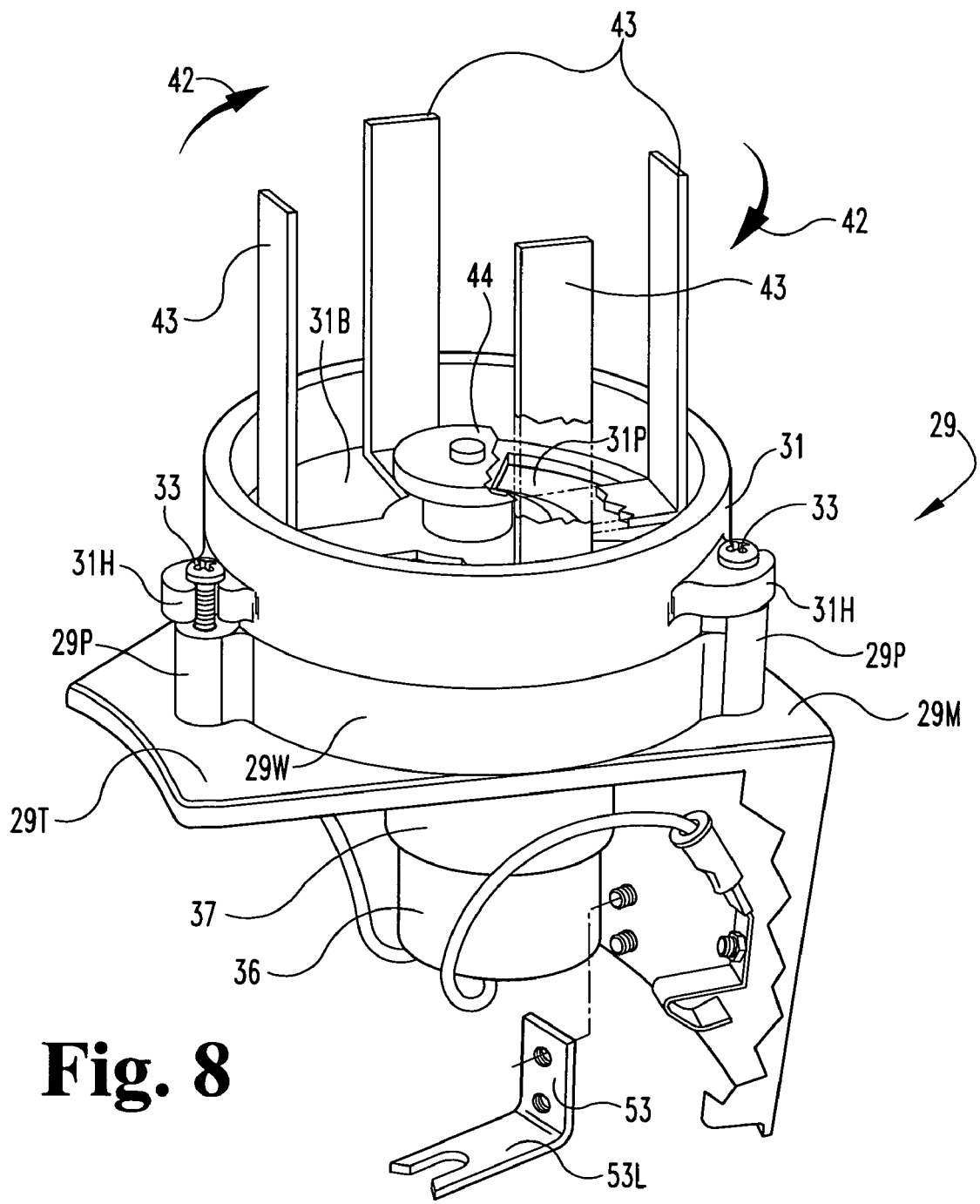
FIG. 8 is a perspective view of a dispensing module.
Figure 9:
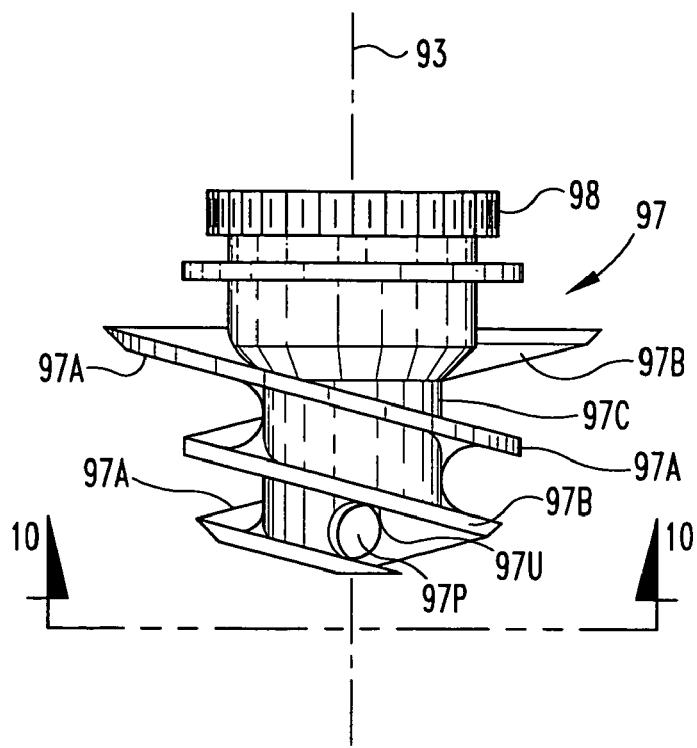
FIG. 9 is an enlarged elevational view of a blending auger.

All of the eight modules can be identical, so a description of one will suffice. Referring to FIG. 2A, note that the module shown to the left of the axis 26 shows motor housing 29 with a gear motor assembly 34 inside, but a gear motor assembly for the module to the right side of axis 26 is omitted from the drawing to show other details of the module. Referring specifically to FIGS. 2A and 8, each motor housing 29, usefully made of molded plastic, has a mounting portion 29M which is shaped like a sector of a circle, and is received on upper support plate 24. The housing has a cylindrical wall 29W projecting up from portion 29M and forming an upwardly opening cylindrical chamber 29C (FIG. 2A). The bottom 29B of chamber 29C is the top of an area of mounting portion 29M and has a hole 29H which is in registry with one of the eight holes 24P in the support plate 24.

Container base 31 (also usefully made of molded plastic) sits atop the motor housing 29 and has three hooks received on posts 29P of housing 29 and engaging and hooked to screws 33 in posts 29P by a counterclockwise twist of the base 31 relative to the housing 29. The bottom 31B of the container base 31 has a hole 31P (FIG. 8) which is in a sector diametrically opposite (relative to axis 41) the sector in which hole 24P in the upper support plate 24, and hole 29H in the housing 29 are located, the latter holes 24P and 29H being open to the funnel 23.

The gear motor assembly 34 with motor portion 36 and reduction gear portion 37 is fastened by screws (not shown) to the bottom of the mounting portion 29M of the motor housing. The output drive shaft 37S of the gear portion projects up through a small hole in the center of chamber bottom 29B, and through the hub 38H of ingredient transfer impeller 38 (FIGS. 15A, 15B) which has four blades 38B circularly spaced about the shaft axis 41. The blades are about half the height of the chamber 29C. The upper portion of the leading (when the impeller is driven in the direction of arrow 42) edge of each blade is sloped up toward the trailing edge. This feature helps avoid jamming of certain types of ingredients between the impeller blades and the roof of the chamber 29C. The shaft 37S also projects through a small hole in the center of bottom 31B of the container base 31 and through the hub of the four-arm agitator 43 (FIG. 16). The shaft receiving holes in the center of the transfer impeller hub and in the center of the agitator hub have a flat which matches the flat on drive shaft 37S to drive the impeller and agitator when the motor is energized. A rubber cap 44 holds the agitator on the shaft.

As shown in FIG. 16, the agitator arms are slightly offset ahead of radii from the rotational axis 41 of the agitator. Accordingly the leading edges of the agitator arms are about one-half arm's width ahead of the leading edge of the transfer impeller blades. This is shown in FIG. 16 where the impeller arms are shown in dotted lines. This feature assists in the transfer of ingredients from a container 32 to chamber 29C.

The container base 31 provides an upwardly opening cylindrical chamber which friction fits and receives the neck portion 32N at the open end of container 32. The fit is close enough that there is no leakage of the dry ingredients up and out of the base 31 around the container neck.

Each module is retained in place in at least two ways. The first way involves a motor housing retainer plate 46 fastened to upper support plate 24 by four screws 47 equally spaced circularly, about axis 26, with spacers 48 between plates 24 and 46. The spacing thereby provided admits the tongue 29T (FIG. 8) of the motor housing and prevents it from tipping up.

A second way the module is retained is by a clamping knob 51 fixed to a screw 52 which is freely receivable into a slot in leg 53L of bracket 53 which is fixed to the inside wall of motor housing 29. The slot is forked with its open end facing toward axis 26. The screw is threaded into lower support plate 27 so that, when a module is properly inserted as in the direction of arrow 56 (FIG. 2A) toward axis 26, the screw is received in the fork slot and the knob 51 can be turned to clamp the module to the lower support plate 27. So it is clamped to the receiver frame of plates 24, 27, 28.

Each of the modules has two electrical contactors 58 on the inner face of the motor housing and which, when the module is installed, engage contactors such as 59 mounted on the vertical supports 28, to enable electric power feed from an electronic controller 61 (FIG. 1) to the motors 36. An eight pair connector socket 62 fixed in the mounting base receives mating plug 63 fixed in the lower support plate 27. The two contactors 59 from all of the eight stations are wired to plug 63. A pair of leads from the socket at 62 extend in wire 64 to the plug 66 received in socket 67 at the end of wiring 68 which enters the wiring harness 69, which extends to the controller 61. The wiring harness also contains cables 71, 72 and 73, each of which has an electrical socket at the end for connection to some component of the apparatus. Cable 71 connects to a plug 74 for communication with the data entry panel 76. Cable 72 connects to a plug 77 for cable 78 to an auger drive motor 79. The plug on cable 73 is connected to socket 81 for the dispenser start switch 82. This arrangement makes it easy to disconnect the electrical components by simply removing the mounting base cover panel 83 from the bottom of the mounting base and unplugging the electrical connectors.

The data entry panel (DEP) 76 is received in a downwardly opening slot 84 (FIGS. 2A, 2B and 5) by sliding it upward into the slot 84 and into chamber 85 in the mounting base. It is retained in place by the mounting base cover panel 83 which is screwed into the bottom of the mounting base. The face of the keypad has legends for programming the equipment, as will be described hereinafter. The output from the keypad is fed through connector 74 and cable 71 in harness 69 to the controller 61.

A blender assembly 90 has a housing 91 (FIG. 2B and FIG. 18 bottom view) mounted to and supported on the freezer by a mounting bracket (not shown) to secure the blender assembly to the freezer. The blender assembly is coupled to spigot 13 by adapter 92 having upper end 92U received on and sealed by an o-ring to the spout. The adapter has flange 92F receiving a collar 92C connected to the upper end portion 90U of the blender assembly by a split ring retainer 92R in a circular groove in the upper end portion of the blender assembly. The adapter is sealed by an o-ring to the inside surface of the upper end portion 90U of the blender assembly. Varieties of mounting brackets and adapters are available to accommodate different freezer configurations. Since a freezer typically dispenses in some axial direction, it can be convenient but is not necessary to adopt such axis in implementing the present invention. In the present example, an axis 93 is established by the housing 91 for the blender assembly. A blender hopper 94 is mounted to housing 91.

Figure 18:
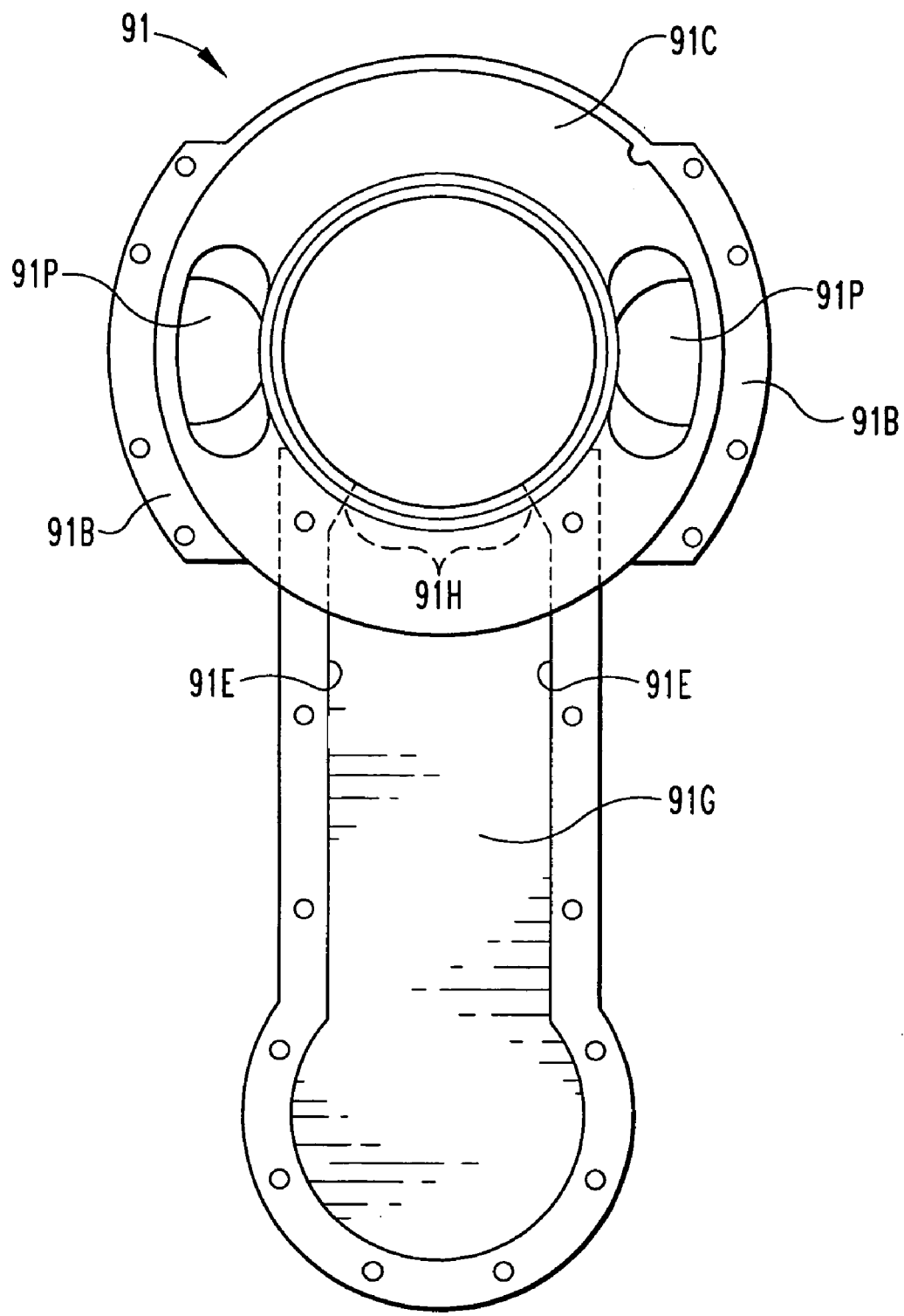
FIG. 18 is a bottom view of a blender housing, with bottom coverings removed.
Figure 19:
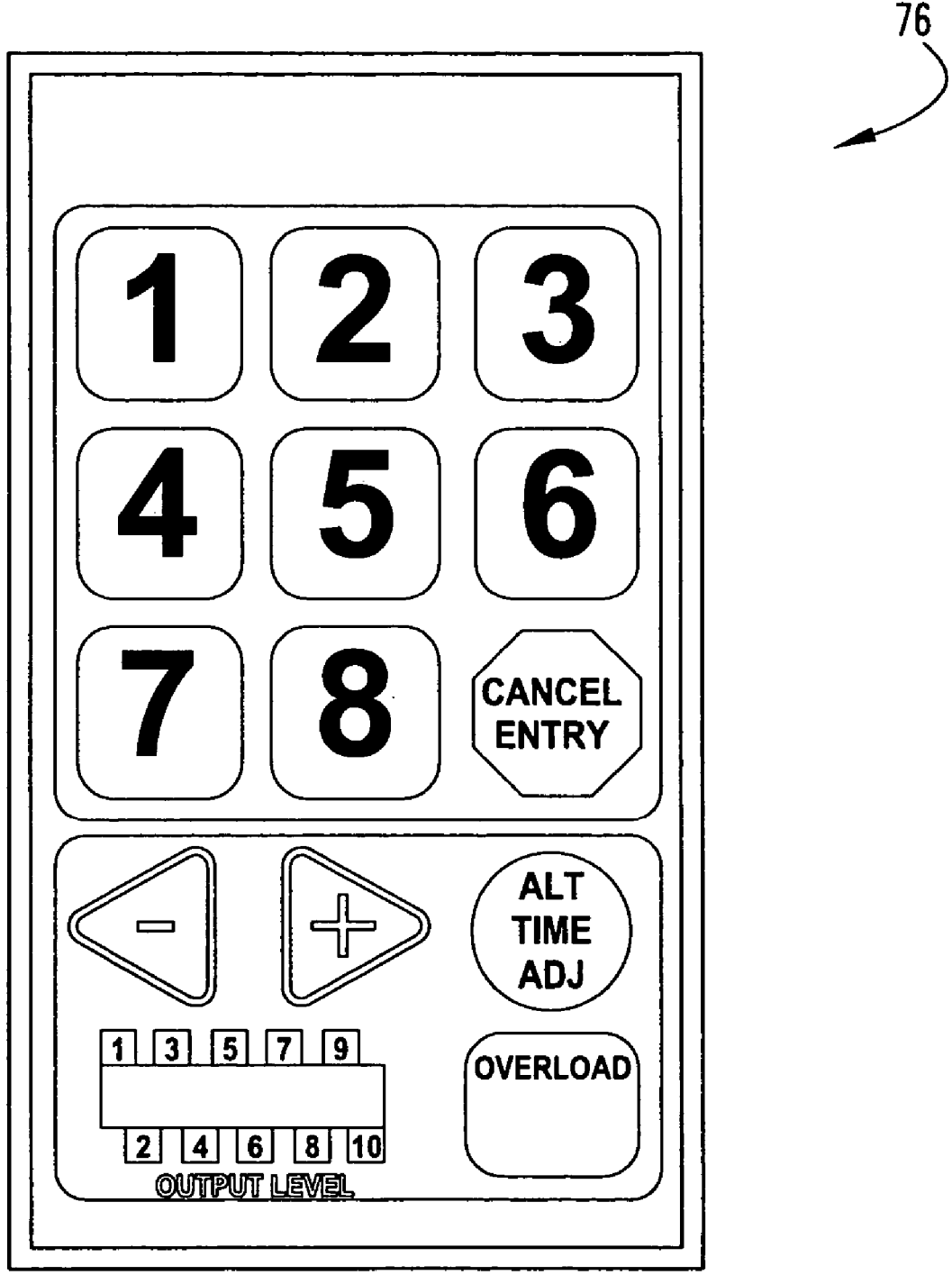
FIG. 19 is a front view of a data entry panel.

Since the blender hopper is to receive solid ingredients from selected ones of containers 32, the housing 91 has two upwardly-opening circular ports 91P to which tubing 96 can be connected to deliver ingredients from hopper 23 through the housing 91 to the blender hopper 94. In FIG. 18, these ports are shown, but need not be, located on diametrically opposite sides of the cylindrical wall 91W of the housing and which is centered on axis 93. It is adequate to use only one of these ports for connection to the tubing, but two of them are provided to facilitate alternate entry locations for adaptation to freezers of different designs.

Figure 2B:
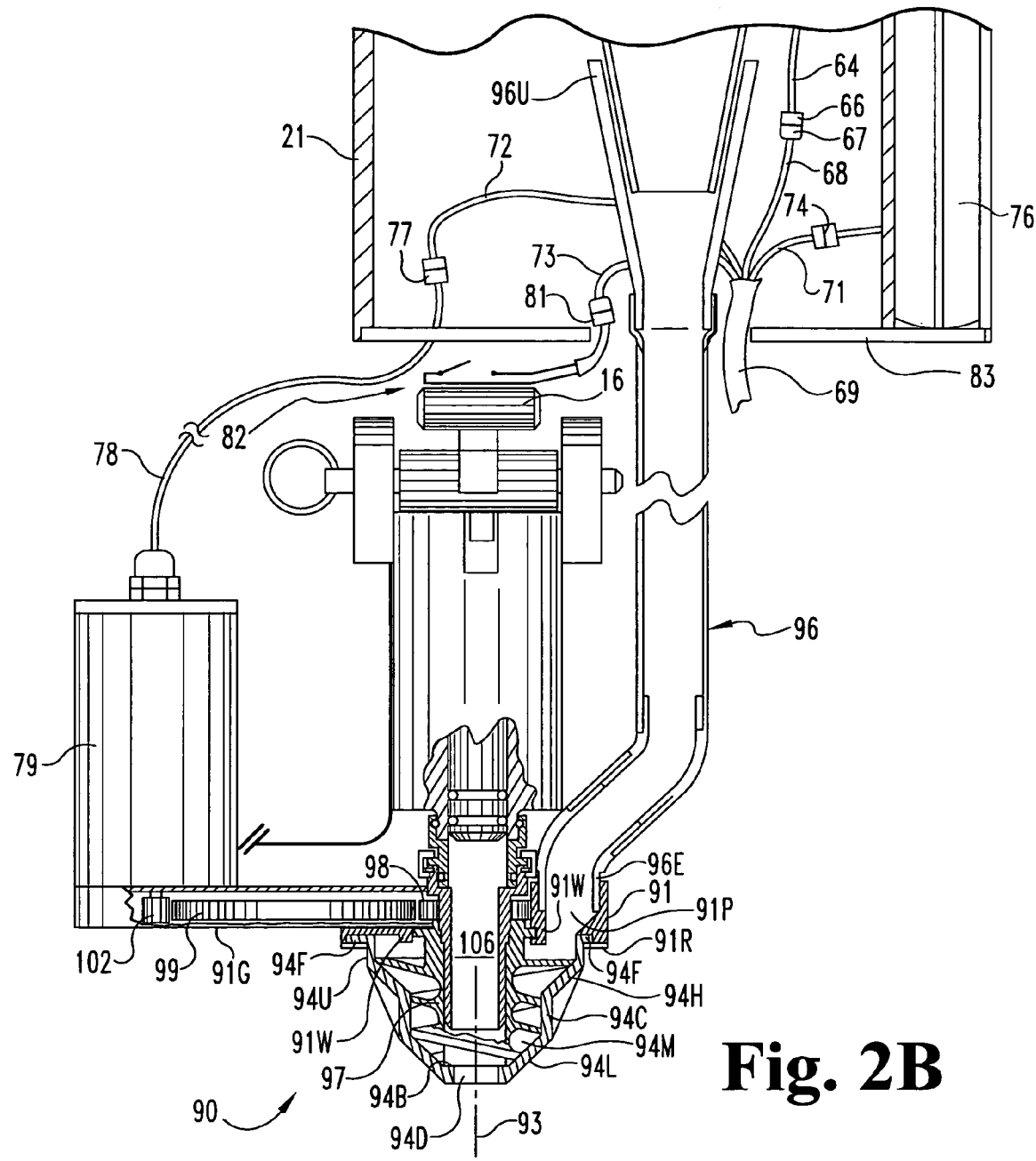
FIG. 2B is a front view in section on the same scale as FIG. 2A and showing a blender assembly.
Figure 3:
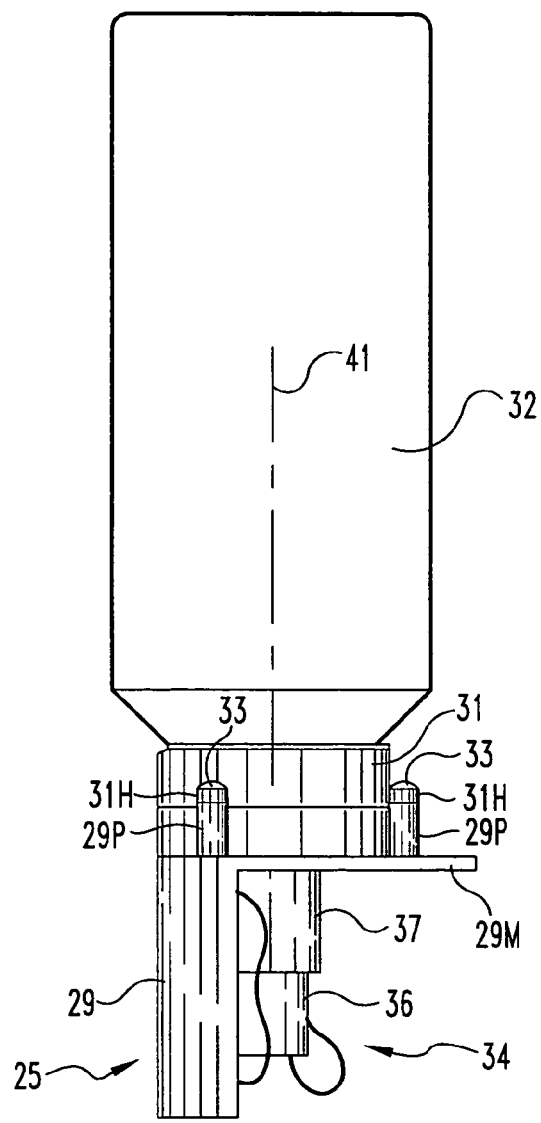
FIG. 3 is a side view of an ingredient container module.
Figure 4:
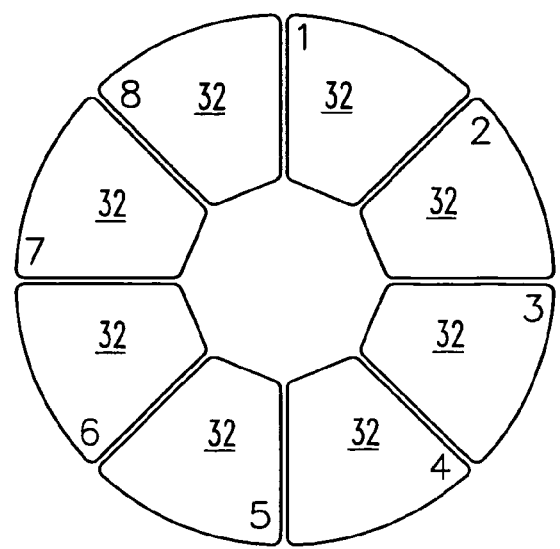
FIG. 4 is a top plan view of an array of eight ingredient containers on a scale intermediate FIGS. 1 and 3.

The illustrated transfer tubing 96 comprises lengths of transparent PVC plastic with assorted shapes assembled to adapt to the particular freezer configuration. The tubing has a conical upper end portion 96U receiving the tapered lower end portion 23L of hopper 23. As can be seen in FIG. 2B, while the lower end portion of the dispensing hopper 23, and the upper end portion 96U of the tubing 96 are conical in shape to fit well together and avoid entry of dirt into the tubing 96, they are not wedged together. Being a slip-fit, the dispensing hopper and assembly above it can be separated easily from the apparatus below it if, and when desired. The lower end of tubing 96 has the elbow 96E received in one of the ports 91P of the housing 91. The unused port (or ports, if provided) 91P can be closed by a cap or caps such as 91T in FIG. 11.

In the illustrated example, the blender hopper 94 (FIGS. 12 and 15), usefully made of molded plastic, is shown in the form of a stepped conical device having two diametrically opposite outwardly-extending top flanges 94F, each extending approximately 60 degrees about axis 93. The blender hopper is mounted to the bottom of the housing 91 by placing the top edge of the hopper against the bottom face of the housing. Then the hopper is turned clockwise (as viewed from above) to move the hopper flanges 94F into position in grooves formed between arcuate retainer clips 91R (FIG. 2B) and flanges 91B (FIG. 18) on the bottom of the housing. The retainer clips are of the same shape as the flanges 91B and are screwed into the bottom of housing 91 at flanges 91B (FIG. 18).

The hopper has an inner wall surface which is stepped. In the illustrated example, the wall surface includes an upper cylindrical portion 94U with flanges 94F at the top, the upper portion extending downward to a first circle. An upper conical portion 94H extends downward from the first circle to a second circle. A second cylindrical portion 94C extends downward from the second circle to a third circle. A second conical portion 94L extends downward from the third circle to a fourth circle at the bottom of the hopper. A blending chamber 94M is surrounded by the lower portion 94L of the hopper.

The blender hopper surrounds a blending auger 97 of the screw type and which is centered on axis 93. The blending auger has a gear 98 integral with it or affixed to it and driven by a gear set 99 in a drive housing portion 91G of housing 91. At this point it should be mentioned that, while FIG. 1 shows tubing 96 entering housing 91 at a port location offset from and forward of axis 93, FIG. 2B shows tubing 96 entering the housing at 91P to the right of axis 93. As mentioned above, the two ports are available for the use of whichever one or both are convenient, depending on the configuration of the freezer. Also, if desired, locations of the ports relative to each other and to the drive housing portion 91G can be different from shown. There is an opening 91H (FIG. 18) through wall 91W in the proximal end of drive housing portion 91G where one of the gears in the gear set 99 engages gear 98 on the auger, as shown in FIG. 2B. The gear set is driven by a pinion 102 on the output shaft of blender motor 79 mounted to the distal end of the drive housing portion 91G.

The housing ports 91P open downward into a space 91C (FIG. 11) under the cylindrical inner wall 91W of the housing 91 and open to the upper ends of the screw flights of auger 97. The blending auger 97 (FIGS. 9–14), which may usefully made of molded plastic, has a central, axially extending hollow core 97C (FIG. 10) on which there are two helical flights 97A and 97B, each of which is centered relative to axis 93. Each of the flights has a leading edge which is beveled downward and rearward as shown at 97L (FIG. 12). Each flight is contoured to have a profile which fits the profile of the stepped conical inside wall surface 94H, 94C and 94L of the blender hopper 94. Thus, it is seen that the auger flights have a profile contoured to sweep the inside space of the blender hopper outboard of the auger core as the auger is rotated on axis 93. To improve the efficiency of the auger, the perimeter of each flight has an edge which is cylindrical or beveled to conform to where it is axially along the auger relative to the inside wall surface of the hopper.

A spindle tube 103 is a stationary tube having a longitudinal axis co-linear with axis 93, and is fixed to the housing 91. The tube delivers the flow of the frozen base product from the freezer to the blending chamber 94M. The tube also serves as an axle spindle for rotational bearing of the auger. The lower end 103B of the tube 103 is spaced above the base 94B of the blender hopper. The resulting space between the end of the tube 103 and the base 94B of the blender hopper allows the solids delivered by the auger to enter into the flow path of the frozen base product.

While the frozen base product flows, the auger 97 rotates clockwise (viewed from above) on the tube 103 and delivers the selected solids into the blending chamber 94M. The inside diameter d1 (FIG. 14) of the tube 103 is less than the overall maximum diametrical dimension d2 (FIGS. 14 and 15) of the fluted hopper outlet opening 94D. This allows unrestricted flow from the tube 103 through the blending chamber 94M and then through the hopper outlet opening 94D (FIG. 14). This size differential allows for the inclusion of the solids into the frozen base product in the blending chamber 94M for delivery of the blended product out through the blended product outlet opening 94D. It should be understood that the outlet opening can be circular or other shapes.

Two diametrically opposite cutouts 97P (FIGS. 9 and 11) in the auger core 97C near the bottom of the auger 97, allow the solids to be introduced into the flow path of the frozen base product while the auger 97 is rotating. The rotation of the auger 97, at approximately 400 rpm, inhibits the frozen base product from entering the outer circumference of the blending chamber 94M and working upward along hopper wall surface 94L. The rapid rotation of the auger 97 tends to confine flow of the base product to a flow path directly downward from the opening of the tube 103 and through the opening 94D.

The two helical flights 97A and 97B of the auger 97 are each provided with a two-step diminishing radius (with respect to the rotational axis 93). This diminishing radius provides a swept volume profile by the rotating auger and which fits the above-mentioned contour profile of the stepped inside wall surface (94H, 94C and 94L) of the blender hopper 94. The diminishing radius of the contoured wall of the blending chamber 94M causes the solids to be forced inward toward the flow path of the frozen base product. The diminishing radius also counters the tendency for the base product to flow to the outer perimeters of the blending chamber 94M. The diametrically opposite cutouts 97P in the core wall of the auger, enable the solids to be forced inwardly into the frozen base product as it flows from the lower end 103L of the spindle tube to the outlet opening 94D.

The cutouts 97P through the core wall under flights 97A and 97B at the bottom faces such as 97U (FIGS. 9–14) may be formed in or cut in or otherwise provided in a material. Therefore the term "cutout" should not be construed as limited to an opening that is cut into the material.

Figure 10:
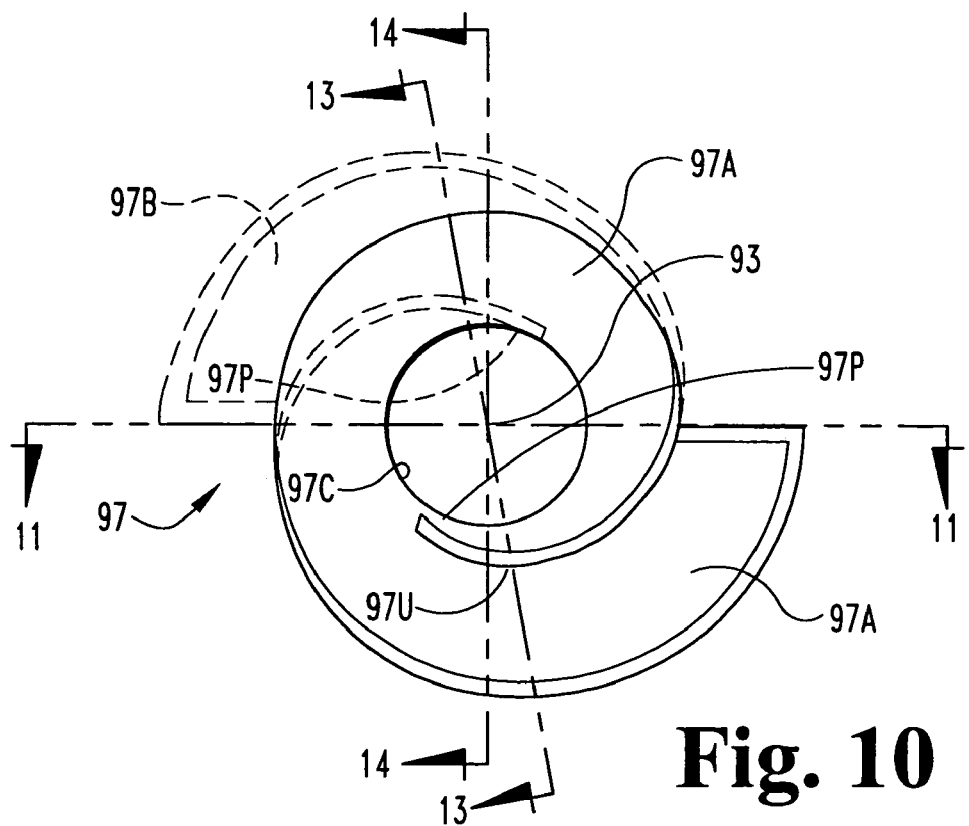
FIG. 10 is a bottom view of the blending auger.

FIG. 13 shows the core wall portions at section 13—13 in FIG. 10, immediately uphill of the beginning of the cutouts 97. FIG. 14 shows where the inner surface of the core flares outward in curves at section 14—14 to blend into the bottom faces of flights 97A and 97B immediately below where the cutouts begin downward toward the lower ends of the flights.

This provides easy entrance of solids into the frozen base product stream under the lower end 103L of spindle tube 103 flowing to outlet 94D as the auger rotates in the direction of arrow 104 (FIG. 10), which is clockwise when viewed from the top of the auger. Portions of the inside wall of the core 97C continues down as shown in FIGS. 11 and 14 supporting the tips 97T of the flights in cantilever fashion at the bottom ends of the flights.

It should be noted that while it is very convenient, and preferred to have the auger axis in line with the axis direction of discharge of base product from the freezer, it is not absolutely necessary. Also, while it is preferred to have the passageway from the spigot through the blender provided by a tube which also serves as the bearing axle for the auger, the auger axis could be offset from the tube axis. Also, while the tube can serve directly as the bearing for the auger, as shown, it could simply serve as a mounting for separate bearings.

Referring to FIG. 18, the data entry panel (DEP) 76 has numerals 1–8, each designating a "key" by which the dispenser operator can select a different one of the eight ingredient containers. It also has several other "key" identifying legends on it, including a "cancel entry" legend, a "+", a "–", and an "alt time adj" legend. It also has an "output level" indicator light emitting diode set with eight enumerated levels, and an "overload" indicator light.

OPERATION

As indicated above, a typical embodiment of the invention is intended to be attached to a freezer capable of delivering an icy base product, to blend or mix various ingredient solids into the base product as it flows from the freezer toward a customer's serving cup. The system example described above accommodates eight different ingredients. The operator can select a single ingredient or up to as many as eight different ingredients to be blended into a single serving of the frozen base product.

To dispense a serving to a customer, the operator determines the output level (the duration of time of operation of each of the selected ingredients) per cycle of dispensing ingredients requested by the customer. Then the operator touches those of the selector "keys" needed for the ingredients requested by the customer. This sets up the program for the controller 61 to activate, in sequence, the dispenser motors 36 for those of the eight containers holding the ingredients requested by the customer. Then the operator pulls the draw handle 16 down, enabling the frozen base product to flow down through the auger axis passageway in spindle tube 103. When the operator pulls the draw handle down, the draw switch 82 is closed which activates the dispensing motor 36 in the dispensing module that represents the lowest numbered choice in the operator's selection 1–8. As the motor activates, it rotates the transfer impeller 38 that takes the ingredient solids from the selected container 32 and transfers them to the registering openings 29H, 24P dropping the solids into the dispensing hopper 23. The transfer impeller serves both as a valve and a device to transfer the ingredients toward the dispenser hopper 23. The solids flow down through the transfer tubing 96 into the blender hopper 94 and down through the hopper under control of the auger 97, into the blender chamber 94M where the solids are integrated into the frozen base product as the base product flows out of the lower end of spindle tube 103.

At the same time that the draw switch is closed to start the dispensing process, the blender motor 79 is activated, rotating the blending auger 97 in a clockwise direction (viewed from above) to force the ingredient solids into the frozen base product while it flows from the spindle tube through the hopper outlet opening 94D into a cone or dish for the customer. If the operator has selected a multiple of possible choices of ingredients, the system dispenses each choice singularly and in the ascending sequence of the numbers of the choices selected on the DEP (data entry panel) 76. The operating time is equal for each dispensing module during a sequence through the operator's selection. When the system has sequenced through all of the choices (completed a cycle), it returns to the initial choice and continues the rotation through the selected choices until the operator chooses to discontinue the process by closing the spigot draw handle. The operating time for each module can be changed to increase or decrease the cycle time for each serving, by touching the "alt time adj" "key" and the "+" or "–" key. As the operator changes the cycle time, the "output level" lights are illuminated accordingly to indicate the output of the solids into the frozen base product. For example, if the adjustment is such that light 9 is on, it indicates that each module in a selection following the "alt time adj" adjustment will dispense solids longer in a cycle than if the adjustment were such that light 6 was on. The average typical cycle time is 1 second. The preferred minimum cycle time is 0.2 seconds. The preferred maximum cycle time is 2.0 seconds. Other cycle characteristics can be specified, if desired. The draw duration is typically between 5 and 10 seconds. This depends primarily upon the size of serving to be delivered to the customer, and the delivery speed of which the freezer is capable. In any case, the controller 61 will repeat the cycling through the choices as long as the draw switch 82 remains closed. It should be understood that some freezers have switch keys, rather than handles to operate a switch to draw the frozen base product from the freezer. In such cases, such switch can be used instead of switch 82 to operate the apparatus of the present invention. Therefore the term "switch" where used in the claims which follow herein, should not be construed as limited to a separate, handle operated switch, except where required by claim context.

To refill a container, the module is removed by loosening the retaining knob 51, and pulling the module radially outward. Then it is inverted, so that the container 32 is upright. Then the module is pulled upward off the container. Then the container can be refilled with the same ingredient, or cleaned and refilled with some other ingredient.

From the above description, it can be recognized that all of the disclosed apparatus can be easily disassembled for cleaning, and then re-assembled.

The apparatus can be powered conveniently by any suitable electric source, an example being a power supply portion of controller 61 and operable on either 110 or 220 volts at 50 or 60 hertz.

The above description refers to the use of a draw handle to initiate delivery of base product from the freezer, and delivery through a spigot, and a switch associated with the draw handle to initiate operation of the dispenser motors and the auger. It should be noted that the invention is useful on a variety of freezers. Therefore, initiation of flow of the base product and controller functions can be triggered by some initiator other than a draw handle. Examples include but are not limited to a switch key or a sound or voice-activated switch. The use of the term "key" should be understood to mean some activator spot or device responsive to the operator's command, however delivered. Wiring, electronics and software for the selector and controller to produce the functions described herein are well within the skill of the art, and description herein would be superfluous.

Therefore, while the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary, and embodiments lacking the same may be contemplated as within the scope of the invention, that scope being defined by the claims that follow.

What is claimed:

1. Apparatus for dispensing a chilled viscous confection comprising a blend of frozen edible base product and edible ingredient solids, the apparatus comprising:

a receiver for stationary attachment to a freezer producing a frozen edible base product and for receiving the frozen base product from a dispensing outlet of the freezer;

said receiver having means for coupling to the dispensing outlet of the freezer;

said receiver having a blending chamber;

a conveyor auger having a portion in said blending chamber;

an auger drive motor coupled to said auger for driving said auger in rotation;

a plurality of containers for ingredient solids;

a plurality of valves, each of said valves being associated with a different one of said containers for controlling delivery of solids from said containers;

a dispensing hopper associated with said valves to receive solids delivered from said containers;

a passageway from said dispensing hopper to said blending chamber for delivery of solids from said dispensing hopper to said blending chamber;

a plurality of valve drive motors, each of said valve drive motors being coupled to a different one of said valves;

a controller coupled to said valve drive motors and having a selector for selecting and enabling selected ones of said valve drive motors to operate in sequence;

a switch coupled to said controller and operable to activate said controller to operate selected ones of said valve drive motors to operate valves coupled to selected ones of said valves drive motors, to deliver solids from containers associated with said valves which are coupled to selected ones of said ones of said drive motors, to said dispensing hopper for delivery to said blending chamber for said auger to move said delivered solids into said base product during the dispensing of said base product from said freezer.

2. The apparatus of claim 1 and further comprising:

a tube having an inlet end for coupling to the dispensing outlet of the freezer, said tube providing a rotational axis for said auger to be driven in rotation on said axis; and said tube having an outlet end at said blending chamber.

3. The apparatus of claim 2 and wherein:

said receiver includes a blender hopper which has upper and lower ends and a wall which has an inside surface which is circular about said axis, said inside surface having a profile defined by a cylindrical portion and a converging portion extending downward from said cylindrical portion and inward toward said axis;

said blending chamber is in space encompassed by said converging portion;

said auger has first and second helical flights, each flight having an upper end and a lower end, and said flights have a profile matching said profile of said inside wall surface of the blender hopper to fit said inside wall surface and sweep the said delivered solids down said inside wall surface toward said blended product outlet as said auger is rotated on said axis.

4. The apparatus of claim 3 and wherein:

said auger has a hollow core, with said tube extending axially in said core;

portions of said core are cut out beginning at diametrically opposite locations near said outlet end of said tube to provide cutouts on said core; and said cutouts are closer to said blended product outlet than is said outlet end of said tube for enabling said solids when swept down said inside wall by rotation of said auger to move inward toward said axis of rotation and through said cutouts and blend into said base product passing from said outlet end of said tube toward said blended product outlet.

5. The apparatus of claim 2 and wherein:

said receiver includes a blender hopper which has upper and lower ends and a wall which is circular about said axis, the wall having an inside surface portion profile defined in part by:

a first cylindrical upper wall portion extending in a direction axially downward relative to said upper end to a first circle, a first conical wall portion extending downward and inward from the first circle to a second circle, a second cylindrical wall portion extending downward from the second circle to a third circle, and a second conical wall portion extending from the third circle downward and inward toward a fourth circle at said lower end;

said blending chamber is in space encompassed by said
second conical wall portion;
said auger has a first helical flight having an upper end and
a lower end, the lower end of said flight being in said
blending chamber;
said flight has an outer perimetrical edge with a profile
matching said wall surface profile to fit the said wall
inside surface of the blender hopper and sweep said
solids down the said wall inside surface as said auger
is rotated on said axis.

6. The apparatus of claim 5 and wherein:
said tube surface which provides a rotational axis is an
exterior cylindrical bearing surface;
said auger has a hollow core with an interior cylindrical
surface portion rotatably received on said bearing surface of said tube, whereby said tube provides said
rotational axis for said auger.

7. The apparatus of claim 6 and wherein:
said auger has a second helical flight which has an upper
end at a location diametrically opposite, relative to said
axis, the upper end of said first flight; and
said second flight has a lower end at a location diametrically opposite relative to said axis, the lower end of said
first flight and the lower end of said second flight is in
said blending chamber.

8. The apparatus of claim 7 and wherein:
portions of said auger core have cut-outs at diametrically
opposite locations near said lower ends of said auger
flights; and
the interior surface portion of the core is flared outward
diametrically from said cylindrical surface portion to
the bottom faces of the flights at the top of the cut-outs.

9. The apparatus of claim 8 and wherein:
said outlet end of said tube is adjacent the said bottom
faces of the flights at the tops of the cut-outs.

10. The apparatus of claim 9 and wherein:
the lead of each flight is the same as the lead of the other
flight and is a distance, measured in the direction of
said axis, between points 360 degrees apart on the outer
peripheral edge of a flight; and
the distance between the second circle and the third circle
on said blender hopper and measured in the direction of
said axis is substantially equal to half the lead of the
flights.

11. The apparatus of claim 9 and wherein:
the bottom of said blending chamber is at said fourth
circle;
the lower ends of said flights are at the bottom of said
blending chamber; and
the inside diameter of said auger at said lower ends of said
flights is substantially the same as the inside diameter
of said interior cylindrical surface of said auger core.

12. The apparatus of claim 9 and wherein:
the upper ends of said flights have leading edges which
are beveled downward and rearward from said leading
edges.

13. The apparatus of claim 12 and wherein:
said leading edges extend radially outward at diametrically opposite locations relative to said axis.

14. The apparatus of claim 7 and wherein:
said auger has a gear above the upper ends of said flights;
and
said gear is centered on said axis; and
said auger drive motor is coupled by gearing to said gear.

15. The apparatus of claim 1 and further comprising:
(1) a mounting base arranged for stationary attachment to
said freezer;
(2) a plurality of storage modules mounted to said mounting base, each module having:
  (a) a motor housing containing one of said valve drive
  motors and having a valve cavity containing one of
  said valves, the valve cavity having a bottom; and
  (b) a container base secured to said motor housing and
  covering said cavity, and said container base having
  an upwardly opening socket receiving an open end of
  one of said containers; and
  (c) a fastener securing said module to said mounting
  base, said fastener being operable to a loose condition to enable removal of said module from said
  container base.

16. The apparatus of claim 15 and wherein:
each of said storage modules has a plan view shape like
a sector of a circle, and said modules are mounted to
said mounting base in side-by-side arrangement
whereby said plurality of modules form a circle of said
modules, and each of said modules is removable from
the circle independently of the other modules.

17. The apparatus of claim 15 and wherein:
each of said valves is a transfer impeller coupled to said
drive motor for rotation by said drive motor to transfer
solids dropped from a container mounted in a container
base socket having a bottom, through a first hole in the
bottom of the socket, from the valve cavity to a second
hole in the bottom of the valve cavity for dropping the
solids into the dispensing hopper.

18. The apparatus of claim 17 and further comprising:
an agitator in each of said container base sockets and
coupled to said drive motor, said agitator projecting
into the open end of the container received in said
socket to stir solids in said container while said transfer
impeller transfers said solids in said cavity from said
first hole to said second hole.

19. The apparatus of claim 18 and wherein:
said transfer impeller has at least two arms extending
outward radially relative to a rotational axis of the
impeller, said arms being about one-half as high as said
valve cavity from the bottom of said cavity to the
bottom of said container base socket, and said arms
having faces which are leading during rotation of said
impeller beveled at the top of the arms; and
said agitator has arms generally parallel to said impeller
arms and having leading faces indexed rotationally
ahead of said leading faces of said impeller arms.

20. The apparatus of claim 15 and wherein:
said solids containers received in said container base
sockets are retained by friction fit into said sockets, but
each of said modules is removable by hand from the
container received in the module socket and without
tools, to refill a container with solids when the open end
of the container is facing upward.

21. The apparatus of claim 1 and wherein:
said selector includes a panel having:
a plurality of selector keys, each of said keys having
indicia distinguishing said key from all others of said
keys to enable selection of said valve drive motors; and
a cycle time adjusting key.

22. The apparatus of claim 21 and further comprising:
lights associated with said keys to indicate state of actuation of said keys.

23. The apparatus of claim 21 and further comprising:
solids of one type of ingredient contained in at least one
of said containers;
solids of another type of ingredient contained in another
of said containers;

solids of a third type of ingredient contained in a third one of said containers; and
solids of different types of ingredients in others of said containers.

24. Apparatus for blending edible ingredient solids into a flowing, frozen edible base product and comprising:
a body including means for coupling to a dispenser outlet of a freezer for said base product, said body having a blended product outlet, and said body having a spindle tube for passage of said base product from a dispenser outlet of a freezer through said spindle tube toward said blended product outlet, said spindle tube having an upper end and having a lower end;
a storage assembly for storage of ingredient solids for blending with said base product passed through said spindle tube;
a transfer hopper coupled to said storage assembly and to said body for guiding said solids;
said body including a blender hopper coupled to said transfer hopper for receiving ingredient solids from said transfer hopper and for introducing the ingredient solids to said base product;
a blending chamber in said blender hopper between said spindle tube and said blended product outlet;
a blending auger in said blender hopper and encircling at least a portion of said spindle tube and mounted on said spindle tube for rotation on an axis of rotation for moving said solids toward said blended product outlet, said auger having an upper end and having a lower end;
a blender motor coupled to said auger for rotation of said auger on said axis;
valves in said storage assembly and operable, when actuated, for release of stored ingredient solids from said storage assembly to said transfer hopper; and
a controller coupled to said blender motor and to said valves to operate said auger to move released ingredient solids into said base product during passage of said base product from said tube to said blended product outlet.

25. The apparatus of claim 24 and wherein:
said storage assembly includes a plurality of containers for ingredient solids;
said apparatus further comprising:
a plurality of valve activators, each of said activators being associated with a different one of said containers than all of the other activators, and operable independently of all others of said activators, for release of ingredient solids from the one container with which said activator is associated, independent of the other containers of said plurality.

26. The apparatus of claim 25 and wherein:
said controller is coupled to said blender motor and to said valve activators and is operable to establish a time cycle of operation of said activators;
the apparatus further comprising:
a selector coupled to said controller and manually operable to enable a user to select which of said activators will be operated during a cycle of operation of said activators.

27. The apparatus of claim 26 and further comprising:
a switch coupled to said controller and operable, when actuated, to initiate and maintain a period of operation of said blender motor.

28. The apparatus of claim 26 and wherein:
said valves are transfer impellers;
said valve actuators are dispensing motors, each transfer impeller being coupled to a different one of said dispensing motors to be driven thereby for moving ingredient solids from the container associated with said dispensing motor into the transfer hopper.

29. The apparatus of claim 28 and further comprising:
a plurality of agitators, each agitator being coupled to and driven by one of said dispensing motors and extending into the container associated with the dispensing motor for facilitating movement of ingredient solids from the container to the transfer impeller.

30. The apparatus of claim 28 and further comprising:
a switch coupled to said controller selector for initiating operation of selected dispensing motors and the blender motor for rotating said auger and blending ingredient solids released from selected ones of said containers into said base product flowing from said spindle tube to said blended product outlet.

31. The apparatus of claim 26 and wherein:
said controller is operable to predetermine a selected duration of a cycle of operation at a value in a range between 0.2 seconds and 2.0 seconds following initiation of operation of said blender motor.

32. The apparatus of claim 31 and further comprising:
a switch coupled to said selector and operable, when actuated, to initiate operation of said blender motor;
said controller being operable to maintain operation of said blender motor as long as said switch is actuated, and said selector being operable to program said controller to repeat the selected cycle time of operation as long as said switch remains actuated.

33. The apparatus of claim 25 and further comprising:
a freezer producing said frozen base product and having said dispenser outlet and capable of initiating and terminating discharge of said base product from said freezer at said dispenser outlet;
said body being coupled to said dispenser outlet;
said storage assembly being coupled to said body; and
a switch coupled to said controller and operable, when actuated, to initiate operation of said blender motor and at least one of said valve activators.

34. The apparatus of claim 33 and wherein:
said switch is operable substantially concurrently with initiation of discharge of said base product from said freezer.

35. The apparatus of claim 33 and wherein:
said freezer has means for initiating and terminating discharge of said base product.

36. The apparatus of claim 35 and wherein:
said freezer has said dispenser outlet on a spigot;
said body being coupled to said spigot.

37. The apparatus of claim 36 and wherein:
said spigot has a handle which is movable for initiating and terminating discharge of said base product from the freezer; and
said switch is at said handle and is operated by movement of said handle to initiate and terminate said discharge.

38. The apparatus of claim 33 and further comprising:
solids of one type of ingredient contained in at least one of said containers;
solids of another type of ingredient contained in another of said containers;
solids of a third type of ingredient contained in a third one of said containers; and
solids of different types of ingredients in others of said containers.

39. The apparatus of claim 33 and wherein:
said auger has helical flights centered on said axis of rotation and which have lower ends.

40. The apparatus of claim 39 and wherein:

said blender hopper has an inside wall surface which is circular about said axis;

a portion of said inside wall surface has a profile defined by a cylindrical portion, and a converging portion extending downward from said cylindrical portion and inward toward said axis;

said blending chamber is in space encompassed by said converging portion;

said helical flights have a profile matching said profile of said inside wall surface portion of the blender hopper to fit said inside wall surface portion and sweep the said released solids down said inside wall surface portion toward said blended product outlet as said auger is rotated on said axis.

41. The apparatus of claim 40 and wherein:

said auger has a hollow core, with said spindle tube extending axially in said core;

portions of said core are cut out beginning at locations circularly spaced on said core near said lower end of said spindle tube to provide cutouts on said core; and said cutouts are closer to said blended product outlet than is said lower end of said spindle tube for enabling said released solids, when swept down said inside wall surface portion by rotation of said auger, to move inward toward said axis of rotation and through said cutouts and blend into said base product passing from said lower end of said spindle tube toward said blended product outlet.

42. The apparatus of claim 39 and wherein:

said blender hopper has a top and bottom and said blended product outlet at the bottom;

said blender hopper has a first generally conical inside wall portion centered on said axis of rotation;

said first generally conical wall portion tapers downwardly and inwardly toward said axis, and to a first cylindrical inside wall portion;

said first cylindrical wall portion is centered on said axis and extends axially to a second generally conical inside wall portion; and said second generally conical wall portion tapers downwardly and inwardly toward said axis and to said bottom of the blender hopper.

43. The apparatus of claim 42 and wherein:

said auger flights have peripheral shapes which fit the contour of said generally conical and cylindrical inside wall portions of said blender hopper, to sweep said solids received in said blender hopper downward toward said blended product outlet as said auger is rotated.

44. The apparatus of claim 43 and wherein:

said auger flights have upper ends and lower ends; and said lower ends are adjacent the bottom of said blender hopper.

45. The apparatus of claim 44 and wherein:

upper ends of said flights are at diametrically opposite locations relative to said axis of rotation and have leading edges extending in directions radially outward relative to said axis and are beveled downward and rearward; and said lower ends of said flights are in a plane perpendicular to said axis and at diametrically opposite locations relative to said axis and are in a plane containing said axis, and are adjacent to said blended product outlet.

46. The apparatus of claim 44 and wherein:

said lower end of said spindle tube is above the bottom of said blender hopper;

said auger has an elongate core having a longitudinal axis co-linear with said axis of rotation of said auger and having an inner cylindrical surface rotatably received on and radially bearing on a portion of said spindle tube;

said flights are centered on said core and project laterally from said core;

said core has cut-outs which begin at diametrically opposite locations on said core at the bottom faces of said flights adjacent said lower end of said tube; and said cut-outs continue around said axis and adjacent said bottom faces of said flights downward to said lower ends of said flights.

47. The apparatus of claim 46 and wherein:

said cut-outs in said core are closer to said blended product outlet than is said lower end of said spindle tube for enabling ingredient solids moved toward said blended product outlet by rotation of said auger to move inward toward said axis of rotation and through said cut-outs and blend into said product passing from said lower end of said spindle tube toward said blended product outlet.

48. The apparatus of claim 46 and wherein:

said inner surface of said core is deformed from cylindrical at said cutout locations; and portions of said inner surface adjacent said cutouts curve radially outward relative to said axis, curving into the said bottom faces of said flights at said locations where said cutouts begin and continuing downward adjacent said flights.

49. The apparatus of claim 48 and wherein:

portions of said inner surface of said core continue part-cylindrical axially downward to said lower ends of said flights.

50. The apparatus of claim 49 and wherein:

said flights continue downward axially from said locations where said cutouts begin, and inward from said locations toward said part-cylindrical inner surface portions and meet said part-cylindrical inner surface portion at said lower ends of said flights.

51. The apparatus of claim 48 and wherein:

said cylindrical inside wall portion of said blender hopper extends axially a distance substantially equal to the pitch dimension between the portions of said flights extending between said first generally conical wall portion and said second generally conical wall portion.

52. The apparatus of claim 48 and wherein:

said second generally conical inside wall portion defines a side wall of said blender chamber; and the lower end of said spindle tube is adjacent said cut-outs;

whereby said generally conical inside wall portion urges said solids inward toward said axis and through said cut-outs into said base product during rotation of said auger and passage of said product from said lower end of said spindle tube toward said blended product outlet.

53. The apparatus of claim 52 and wherein:

said lower ends of said flights have an internal part-cylindrical surface at a radius from said axis substantially equal to the radius of the inner cylindrical surface of said auger core above said cut-outs.

* * * * *